United States Patent

Zeidler

[15] 3,643,174
[45] Feb. 15, 1972

[54] LASER CONSTRUCTION

[72] Inventor: Gunther Zeidler, Munich, Germany

[73] Assignee: Siemens Aktiengesellschaft, Berlin and Munich, Germany

[22] Filed: Sept. 30, 1968

[21] Appl. No.: 763,509

[30] Foreign Application Priority Data

Sept. 28, 1967 Germany ..................P 16 14 615.9

[52] U.S. Cl.................................331/94.5, 313/22, 313/36, 313/44
[51] Int. Cl..............................................H01s 3/04
[58] Field of Search...................................331/94.5

[56] References Cited

OTHER PUBLICATIONS

Roess, "Microwave," April 1965, pp. 29-33

*Primary Examiner*—Roy Lake
*Assistant Examiner*—Darwin R. Hostetter
*Attorney*—Hill, Sherman, Meroni, Gross & Simpson

[57] ABSTRACT

An optical molecular amplifier (laser) including a mirror system forming a closed cavity having the configuration of a prolate ellipsoid of revolution, a luminous pump source disposed on a transverse axis of the ellipsoid at one focal point thereof, and an excitable material disposed on the transverse axis of the ellipsoid at the other focal point thereof. The closed cavity forming the pump reflector mirror system includes a pair of superposed semiellipsoidal bowls joined along a conjugate axis of the ellipsoid of revolution to form a hermetic seal therebetween. A pair of oppositely disposed flanges are adhered to both longitudinally disposed apex end portions of the closed cavity, and each flange is formed with an aperture passing therethrough disposed coaxially of the transverse axis of the ellipsoid of revolution. The luminous pump source and the excitable material are disposed concentrically within a cylindrical, Dewarlike cooling tube arranged along the transverse axis of the ellipsoid of revolution and supported within the apertures formed in the pair of flanges. The pump reflector including the pair of flanges and the cooling tube which supports the luminous pump source and the excitable material are supported within and encircled by a cylindrical housing disposed coaxially of the transverse axis of the ellipsoid of revolution and provided with closed end portions to form a cavity for receiving a coolant.

7 Claims, 1 Drawing Figure

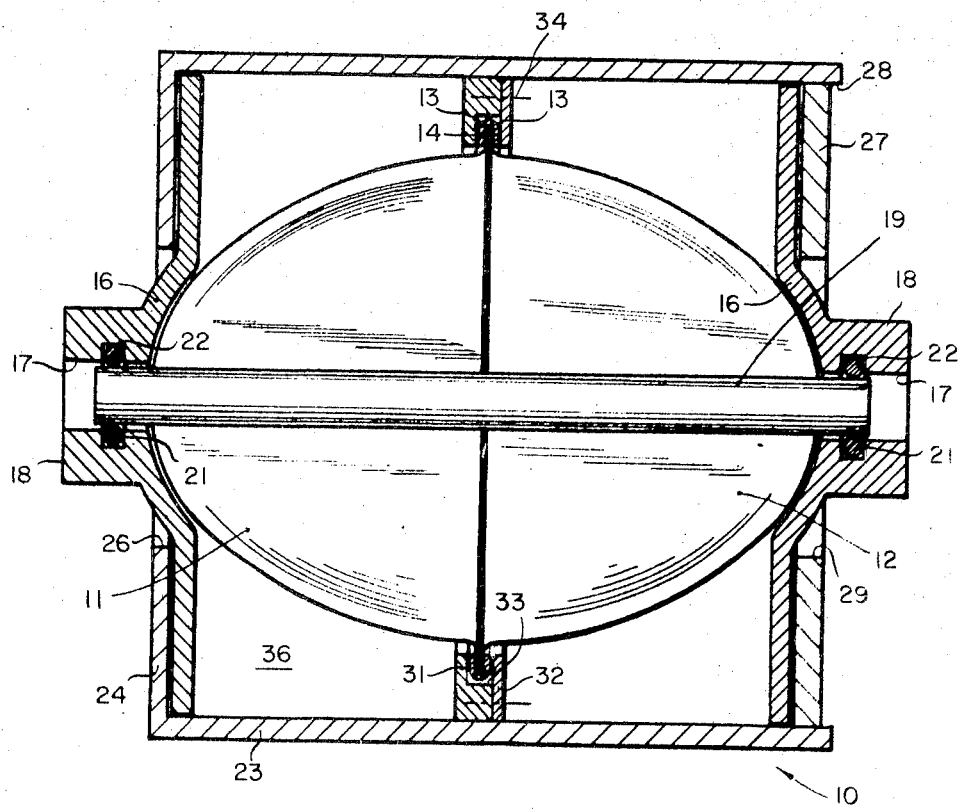

LASER CONSTRUCTION

BACKGROUND OF THE INVENTION

1. Field of the Invention

This invention relates to optical molecular amplifiers (lasers), and more particularly refers to optical molecular amplifiers having a closed cavity formed in the configuration of a prolate ellipsoid of revolution to provide a pump reflector within which a luminous pump source and an excitable material are arranged.

2. Description of the Prior Art

The general principles of optical molecular amplifiers (lasers) and their manner of operation have been sufficiently described in the literature, and reference is made in particular to the book "Laser, Luminous Amplifiers and Oscillators" by D. Röss.

It has been proposed heretofore to form a pump reflector for an optical molecular amplifier with a closed cavity having the configuration of a prolate ellipsoid of revolution, although these prior art devices have not achieved the desired efficiency of operation. In an optical molecular amplifier of the type described hereinabove, the luminous pump source is disposed on the transverse or major axis of the ellipsoid of revolution at one of the focal points thereof, and the excitable material or medium is located on the transverse axis at the other focal point.

It should be noted that a uniform illumination and an acceptable degree of effectiveness are assured only when the luminous pump source and the excitable material are arranged precisely on the principal axis of the ellipsoid of revolution. Moreover, if the luminous pump source is utilized for illuminating an excitable medium having a barlike configuration, the pump source also must be of bar shape.

Also, to achieve maximum effectiveness, the pump reflector must provide both a high degree of reflection and heat dispersion.

SUMMARY OF THE INVENTION

It is contemplated by the present invention to provide an optical molecular amplifier (laser) with a pump reflector system including a closed cavity presenting a concave reflective surface shaped in the configuration of a prolate ellipsoid of revolution and formed by a pair of superposed, semiellipsoidal bowls. The bowls are each formed with an outwardly projecting flange along a conjugate axis of the ellipsoid of revolution and the flanges are joined together to form a hermetic seal between the semiellipsoidal bowls.

In accordance with the principles of one embodiment of the present invention, the semiellipsoidal bowls are formed from high-luster rolled aluminum sheet metal by a hydraulic extrusion process to provide a mar-free, inwardly projecting surface. The reflective characteristics of the inwardly projecting surface are enchanced by applying an anodized protective skin thereonto. Another advantageous embodiment includes forming the semiellipsoidal bowls from a commercial grade aluminum sheet plated with a high-purity aluminum by means of compression rolling. In this second embodiment, the plated surface is electrolytically or chemically polished and an anodized protective skin is applied to the polished surface. In both embodiments of the present invention, the anodized protective skin is formed with a thickness to provide a surface having maximum reflective characteristics.

The luminous pump source and the active material are disposed concentrically within a cylindrical cooling tube and the optical molecular amplifier is provided with means for supporting the cooling tube concentrically of the transverse axis of the ellipsoid of revolution formed by the reflector. The supporting means includes a pair of oppositely disposed flanges adhered to an exterior surface of the semiellipsoidal bowls at opposed apex portions thereof. Each flange is characterized by a circular aperture passing therethrough and being disposed concentrically of the transverse axis of the ellipsoid of revolution. Additionally, each semiellipsoidal bowl is formed with a circular aperture in the apex portion thereof disposed coincidentally of the apertures formed in the flanges. The cooling tube containing the luminous pump source and the excitable material extends along the transverse axis of the ellipsoid of revolution and is supported within the apertures provided by the flanges and the semiellipsoidal bowls. In this manner, both the luminous pump source and the excitable material are assured of being disposed precisely along the transverse axis of the ellipsoid of revolution formed by the pump reflector.

The sealed semiellipsoidal bowls are supported within a cylindrical housing having closed end portions to provide a cavity surrounding the foil bowl members for receiving a coolant.

Therefore, it is a primary object of the present invention to provide an optical molecular amplifier having a pump reflector formed of a pair of superposed, semiellipsoidal bowls composed from high-luster aluminum sheet metal to provide a highly reflective surface and good heat transfer characteristics and including means for supporting a luminous pump source and an excitable material precisely along a transverse axis of the ellipsoid of revolution.

BRIEF DESCRIPTION OF THE DRAWING

In the accompanying drawing, forming a part of this specification, and in which like reference characters are employed to designate like parts throughout the same, FIG. 1 is a cross-sectional view of an optical molecular amplifier (laser) embodying the features of the present invention.

DESCRIPTION OF THE PREFERRED EMBODIMENTS

Referring to the drawing, an optical molecular amplifier (laser) embodying the features of the present invention is indicated generally at reference numeral 10. The optical molecular amplifier 10 includes a closed cavity forming a reflection surface having the configuration of a prolate ellipsoid of revolution and comprising a pair of superposed, semiellipsoidal bowls 11 and 12 joined along a conjugate axis of the ellipsoid of revolution. EAch semiellipsoidal bowl is characterized by an outwardly extending flange formed along the conjugate axis of the ellipsoid of revolution and disposed juxtapositionally with respect to the flange of the other bowl. A tape 14 joins the pair of flanges 13, 13 of the two semiellipsoidal bowls together to form a hermetic seal therebetween.

In one embodiment of the present invention, each bowl 11 or 12 is composed of high-luster rolled aluminum sheet metal which is formed by a hydraulic extrusion process to provide a mar-free surface. Also, an anodized protective coating is applied to the surface of each bowl 11 or 12 to both increase the reflective properties of the inwardly projecting surface and to provide a protective skin. In a second embodiment of the present invention, each bowl 11 or 12 is formed of a commercial grade aluminum which is plated with a high-purity aluminum by a compression rolling process. To provide the reflective surface, the inwardly projecting surface of the bowls 11 and 12 are electrolytically or chemically polished and coated with an anodized protective skin. In both embodiments, the anodized surface is applied to form a coating having a thickness which provides a maximum degree of reflection for the luminous pump source.

In accordance with the present invention, the optical molecular amplifier 10 is provided with means for mounting the luminous pump source and the excitable medium precisely along a transverse or major axis of the ellipsoid of revolution formed by the pump reflector. The mounting means generally includes a pair of oppositely disposed flanges 16, 16 which are adhered to opposed apex portion of the pump reflector formed by the bowls 11 and 12. Each flange 16 is adhered to one of the bowls 11 or 12 by means of an adhesive material. The flanges 16, 16 are characterized by a cylindrical opening 17 which is formed in a hub portion 18 and which has a longitudinal axis disposed coincidentally with the major axis of the ellipsoid of revolution. Additionally, each bowl portion 11 and 12 has a circular aperture formed in the apex portion thereof in alignment with the cylindrical opening 17 of the flanges 16. A cooling tube 19, for example, of the Dewar-type, is longitudinally disposed with the opposed end portions thereof supported within the cylindrical openings 17, 17 of the pair of flanges 16, 16. The luminous pump source of the optical molecular amplifier 10 is supported within the cooling tube 19 in a manner to lie precisely along the major axis of the ellipsoid of revolution formed by the pair of bowls 11 and 12 at one of the focal points of the ellipse. Also, the excitable medium or material of the optical molecular amplifier 10 is disposed within the cooling tube 19 in a manner to lie precisely along the major axis of the ellipse at the other focal point.

A seal is formed between the cylindrical apertures 17, 17 and the cooling tube 19 by an O-ring 21 which engages an exterior periphery of each end portion of the cooling tube and which is received within an annular, undercut groove 22 formed in the hub portion 18 of the flange 16.

The pair of sealed-together, semiellipsoidal bowls 11 and 12 with the pair of flanges 16, 16 adhered to the apex portions thereof is supported within a cylindrical housing 23. One end portion of the cylindrical housing 23 is closed by a disk-shaped flange 24 which is characterized by a centrally located opening 26 formed to receive the hub portion 18 of one of the flanges 16. Another end portion of the cylindrical housing 23 is closed by a disk-shaped cap member 27. The cap member 27 has an exterior cylindrical periphery formed with a diameter to fittingly engage an interior cylindrical surface 28 of the housing 23 for forming a seal therewith. The cap member 27 also has a centrally disposed aperture 29 for receiving one of the hub portions 18 of the other flanges 16, 16.

The semiellipsoidal bowls 11 and 12 are supported within the housing 23 by a pair of annular ring members 31 and 32 which engage the flanges 13, 13. Both ring members 31 and 32 have an exterior, cylindrical periphery formed with a diameter for fittingly engaging the interior cylindrical surface 28 of the housing 23. The ring member 31 is notched out as at 33 to form a recess for receiving the pair of taped-together flanges 13, 13. The other ring member 32 has a disc-shaped configuration and is disposed juxtapositionally with respect to the ring member 31 in a manner to retain the flanges 13, 13 within the recess 33. The disk-shaped ring member 32 is fixedly attached to the other ring member 31 by a plurality of circumferentially spaced fasteners which pass through the ring members as indicated by the centerline 34.

The cylindrically shaped housing 23 having the end portions thereof closed by the flange 24 and the cap 27 forms a closed cavity 36 surrounding the pair of semiellipsoidal bowls 11 and 12. The cavity receives a coolant through appropriately formed ingress and egress studs disposed on the housing 23. The coolant is circulated through the cavity 36 to maintain the temperature of the semiellipsoidal bowls 11 and 12 at a desired level.

The fabrication of the bowls with the aid of an extrusion process is similar to that of the bodywork of motor car fabrication. A piston presses the rolled metal sheet inside a steel matrix. By using a water extrusion technique, the pressure of the piston is transmitted by water to the sheet.

In the embodiment with an eloxal protective skin, described above, the thickness of this protective coating is between $1\mu m$, and $5\mu m$, depending on the used pump light sources (Xenon, Krypton or mercury high-pressure lamps) and on the active material (ruby or $Nd^{3+}$-doped solid states).

To get high reflectivity the purity of the aluminum must be like or better than 99.99 percent, this pure aluminum can be alloyed with up to 2 percent magnesium. Suitable aluminum alloys are on the market under the names "REFLEKTAL" or "ALRMG2.

In the embodiment, described above, which consists of normal aluminum bowls which are plated with pure aluminum, the thickness of the plating is about 0.5 mm.

Although minor modifications might be suggested by those versed in the art, it should be understood that I wish to embody within the scope of the patent warranted hereon all such modifications as reasonably and properly come within the scope of my contribution to the art.

I claim as my invention:

1. In a laser having a closed reflector system within which a luminous pump source and a laser medium are arranged, the combination of:
    a pair of thin-walled, superposed bowl members forming a closed hollow reflector system, said bowl members forming an interior reflective surface having the configuration of an ellipsoid of revolution;
    means forming a pair of flanges disposed on opposed apex portions of the ellipsoid of revolution formed by the superposed pair of bowl members, said flanges extending concentrically of the axis and being formed to support the luminous pump source and the laser medium along a transverse axis of the ellipsoid of revolution;
    means forming a housing having an interior cylindrical surface encircling said pair of superposed bowl members and cooperating with said flanges to form a cavity between said bowl members and an interior surface of the housing for receiving a coolant;
    each of said pair of superposed bowl members having an outwardly projecting flange formed thereon and disposed along a plane defined by a conjugate axis of the ellipsoid of revolution, said flanges being joined together to form a hermetic seal between said bowl members;
    means forming a ringlike member having a cylindrical periphery for engaging an interior cylindrical surface of the housing and also having a recess for engaging said pair of flanges formed on said superposed bowl members to mount said bowl members within said housing; and
    each said bowl member being composed of high-luster aluminum sheet metal with an anodized protective coating applied thereonto.

2. A laser as defined in claim 1, further characterized by:
    said means forming a pair of flanges having a cylindrical aperture formed therein concentrically of the transverse axis of the ellipsoid of revolution at opposed apex portion thereof; and
    a cooling tube having opposed end portions thereof disposed within said cylindrical apertures of said means forming a pair of flanges and within which the luminous pump source and the laser medium are arranged.

3. A laser as defined in claim 1, further characterized by:
    said pair of superposed bowl members forming the closed reflector system providing a reflective surface having the configuration of a prolate ellipsoid of revolution.

4. In a laser having a closed reflector system within which a luminous pump source and a laser medium are arranged, the combination of:
    a pair of thin walled, superposed bowl members together forming a closed hollow reflector system, said bowl members forming an interior reflective surface having the configuration of an ellipsoid of revolution;
    means forming a pair of flanges disposed on opposed apex portions of the ellipsoid of revolution formed by the superposed pair of bowl members, said flanges extending concentrically of the axis and being formed to support the luminous pump source and the laser medium along a transverse axis of the ellipsoid of revolution;
    means forming a housing having an interior cylindrical surface encircling said pair of superposed bowl members and cooperating with said flanges to form a cavity between said bowl members and an interior surface of the housing for receiving a coolant;
    each of said pair of superposed bowl members having an outwardly projecting flange formed thereon and disposed along a plane defined by a conjugate axis of the ellipsoid of revolution, said flanges being joined together to form a hermetic seal between said bowl members;

means forming a ringlike member having a cylindrical periphery for engaging an interior cylindrical surface of the housing and also having a recess for engaging said pair of flanges formed on said superposed bowl members to mount said bowl members within said housing; and each said bowl member being composed of aluminum having aluminum of highest purity plated thereonto and being electrolytically polished and having an anodized protective coating applied thereonto.

5. A laser as defined in claim 4, further characterized by:

said means forming a pair of flanges having a cylindrical aperture formed therein concentrically of the transverse axis of the ellipsoid of revolution at opposed apex portions thereof; and a cooling tube having opposed end portions thereof disposed within said cylindrical apertures of said means forming a pair of flanges and within which the luminous pump source and the laser medium are arranged.

6. A laser as defined in claim 4, further characterized by said pair of superposed bowl members forming the closed reflector system providing a reflective surface having the configuration of a prolate ellipsoid of revolution.

7. A laser as defined in claim 4, further characterized by each said bowl member being composed of aluminum sheet metal having aluminum of at least 99.99 percent purity plated onto the reflective surface to a thickness of approximately 0.5 mm.

* * * * *